US009461336B2

(12) United States Patent  
Beckman (10) Patent No.: US 9,461,336 B2  
(45) Date of Patent: Oct. 4, 2016

(54) RAPID BATTERY REPLACEMENT AND RECHARGING TECHNIQUES (CELLGEL)

(71) Applicant: Christopher V. Beckman, San Diego, CA (US)

(72) Inventor: Christopher V. Beckman, San Diego, CA (US)

(*) Notice: Subject to any disclaimer, the term of this patent is extended or adjusted under 35 U.S.C. 154(b) by 601 days.

(21) Appl. No.: 13/831,770

(22) Filed: Mar. 15, 2013

(65) Prior Publication Data

US 2014/0272521 A1   Sep. 18, 2014

(51) Int. Cl.
| | |
|---|---|
| *H01M 10/42* | (2006.01) |
| *H01M 2/02* | (2006.01) |
| *H01M 10/04* | (2006.01) |
| *H01M 10/058* | (2010.01) |
| *B60L 11/18* | (2006.01) |
| *H01M 2/38* | (2006.01) |
| *H01M 10/052* | (2010.01) |
| *H01M 10/38* | (2006.01) |
| *H01M 4/02* | (2006.01) |
| *H01M 2/20* | (2006.01) |

(52) U.S. Cl.
CPC ...... *H01M 10/4207* (2013.01); *B60L 11/1822* (2013.01); *B60L 11/1824* (2013.01); *B60L 11/1827* (2013.01); *B60L 11/1835* (2013.01); *H01M 2/024* (2013.01); *H01M 2/025* (2013.01); *H01M 10/049* (2013.01); *H01M 10/058* (2013.01); *H01M 10/4214* (2013.01); *H01M 10/4242* (2013.01); *B60L 2240/622* (2013.01); *H01M 2/208* (2013.01); *H01M 2/38* (2013.01); *H01M 10/052* (2013.01); *H01M 10/38* (2013.01); *H01M 2004/021* (2013.01); *H01M 2004/025* (2013.01); *H01M 2010/4271* (2013.01); *H01M 2220/20* (2013.01); *Y02T 10/7005* (2013.01); *Y02T 10/7011* (2013.01); *Y02T 10/7072* (2013.01); *Y02T 10/7291* (2013.01); *Y02T 90/121* (2013.01); *Y02T 90/124* (2013.01); *Y02T 90/125* (2013.01); *Y02T 90/14* (2013.01); *Y02T 90/16* (2013.01); *Y02T 90/162* (2013.01); *Y10T 29/53022* (2015.01); *Y10T 29/53265* (2015.01)

(58) Field of Classification Search
CPC ............ B60L 11/1801; B60L 11/1816; B60L 11/1822; H01M 10/4207
See application file for complete search history.

(56) References Cited

U.S. PATENT DOCUMENTS

| | | | | |
|---|---|---|---|---|
| 2010/0112843 | A1* | 5/2010 | Heichal | B60K 1/04 439/299 |
| 2012/0091955 | A1* | 4/2012 | Gao | B60L 11/1822 320/109 |
| 2012/0326665 | A1* | 12/2012 | Yin | B60L 11/1801 320/109 |
| 2013/0081245 | A1* | 4/2013 | Vavrina | B60L 11/1822 29/402.08 |
| 2013/0282472 | A1* | 10/2013 | Penilla | B60L 11/816 705/14.35 |

* cited by examiner

*Primary Examiner* — Stewart Fraser (57) ABSTRACT

New electrochemical battery recharging, refurbishment and replacement techniques are provided. In some aspects of the invention, small, fungible battery elements may be immersed in a fluid and delivered via a bifurcated pump interface that simultaneously unloads discharged cells and loads new, charged cells, to accomplish rapid cell replacement and recharging. The cells may be magnetically aligned to bring cathode and anode elements together, in series, and bridge contacts within a container (powering an appliance). Density differentials between charged and discharged elements may aid in placing them in series (with similar charge states and capacities) and in removing them during replacement.

In other aspects, electrode elements may be rapidly flushed to accomplish rapid recharging, in a staged process. Aspects of the invention also provide for rapid exchange of larger, streamlined battery elements, without the use of an immersive fluid, and systematic control of recharging balances accomplished by such exchanges.

11 Claims, 7 Drawing Sheets

Fig. 9

RAPID BATTERY REPLACEMENT AND RECHARGING TECHNIQUES (CELLGEL)

FIELD OF THE INVENTION

The present invention relates to the field of electrochemical batteries and, more specifically, rechargeable batteries.

BACKGROUND

Electrochemical batteries ("batteries"), which provide a stable, continuous electrical current to a circuit from a chemical energy source, have been in use at least since the early 1800s, when Allesandro Volta invented the voltaic pile. In a battery, internal chemical reactions (such as an oxidation/reduction reaction) drive electrons (and, therefore, a negative net charge) to an electrical contact called an anode, and a positive charge to another electrical contact called a cathode. By bridging the anode and cathode with an electrical conductor, a circuit is formed, which may include an appliance, and electrical current flows from cathode to the anode, powering such an appliance. As the battery discharges its current, the internal chemical reaction, and the battery itself, is eventually depleted and must be replaced or recharged to maintain delivery of electrical power in the circuit.

The first rechargeable batteries were lead-acid batteries, originating in the 1850s. By passing an electrical current in the direction opposing its discharge current, some of the chemical reactions are reversed (and the capacity of the battery is restored) in a rechargeable battery. To this day, rechargeable batteries face difficult challenges and are thought by many to be a relatively impractical power source for high-power, high-capacity applications. Among other challenges, each rechargeable battery has its own unique discharge and optimal recharging profile ("curve"), requiring specialized hardware to carefully control, and requiring significant time to accomplish. If sub-optimal discharge takes place, a significant amount of power is lost in waste heat. That waste heat, if mismanaged, can lead to catastrophic events, such as fires that destroy the appliance and injure users. See, e.g., Consumer Product Safety Commission, *PC Notebook Computer Batteries Recalled Due to Fire and Burn Hazard*, Recalls Release No. 09-035 (Oct. 30, 2008), available at http://www.cpsc.gov/en/Recalls/2009/PC-Notebook-Computer-Batteries-Recalled-Due-to-Fire-and-Burn-Hazard/. Incorrectly applied recharge currents, even in batteries designed to be recharged, may result in catastrophic events—such as explosion due to electrolysis releasing gas. Virtually all mainstream battery labels in everyday households instruct laymen on how to avoid the risks of explosion and leakage from common misuse, such as placing the battery into an appliance backwards. See, e.g., Proctor & Gamble, Duracell Duralock 1.5 Volt AA Alkaline Battery Product Label (EXP 2022).

Due to environmental concerns about the use of fossil fuels, electric and hybrid vehicles have been developed, using large numbers of rechargeable batteries. Among the unique challenges in this area are carefully pairing batteries in series arrays with similar electrochemical profiles in terms of capacity and resistance, to prevent individual cells from becoming charged and discharged out-of-sync with one another. Charge management structures are generally too expensive to overcome the challenges in this regard.

SUMMARY OF THE INVENTION

New electrochemical battery recharging, refurbishment and replacement techniques are provided. In some aspects of the invention, small, fungible battery elements may be immersed in a fluid or gel and delivered via a bifurcated pump interface that simultaneously unloads discharged cells and loads new, charged cells, to accomplish rapid cell replacement and recharging. The cells may be magnetically aligned to bring cathode and anode elements together, in series, and bridge contacts within the tank (for power service to an appliance).

Density or other differentials between charged and discharged elements may aid in placing them in proper series (with similar charge states and capacities) and in separating them from one another for removal during replacement. For example, in some aspects, cells attain a final electrostatic charge differential that may drive compression of the cell, to increase its density upon discharge, or vice versa. In others, a discharged battery may attain an electrochemical state that leads it to bind with denser or lighter materials or materials that are more easily filtered or moved (carriers). Such carrier and filtration methods exploit an existing difference between charged and discharged cells, such as salt content in the electrolyte affecting its diamagnetism and motility in a variable magnetic field.

In other aspects, cathode and/or anode elements may be rapidly flushed to accomplish rapid recharging, in a staged process. In some embodiments, a buffer solution may be sorted into chambers to apply a more uniform immersion of the solution about an electrode. This may be done by selective weighting of the solution in different chemical states.

Aspects of the invention also provide for rapid exchange of larger, streamlined battery elements, without the use of an immersive fluid, and the systematic control of recharging balances accomplished by such exchanges.

Where any term is set forth in a sentence, clause or statement ("statement"), each possible meaning, significance and/or sense of any term used in this application should be read as if separately, conjunctively and/or alternatively set forth in additional statements, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

DETAILED DESCRIPTION OF THE INVENTION

Figure 1:
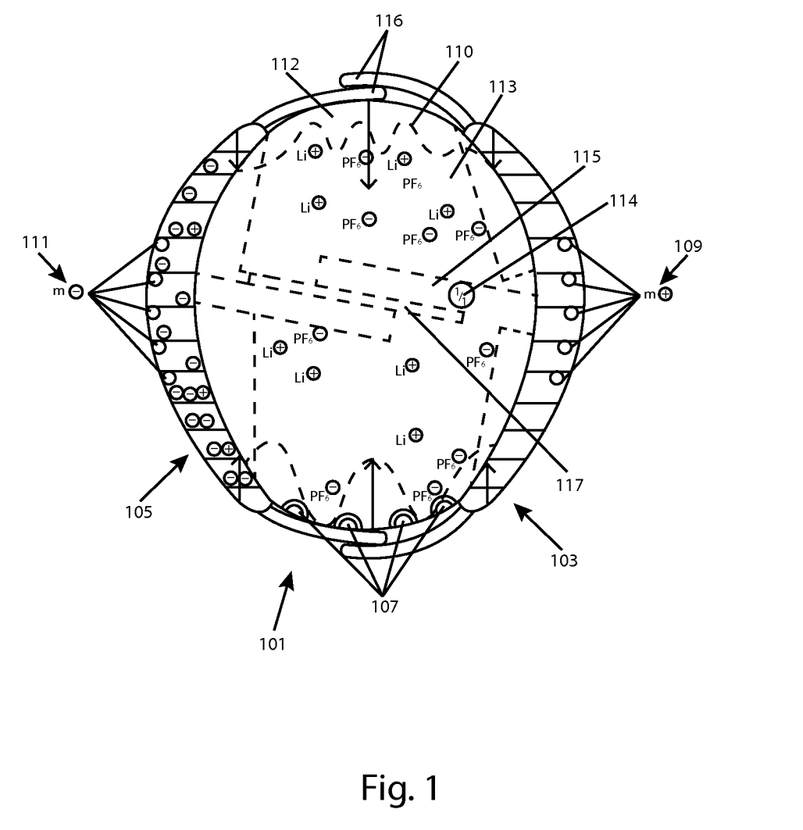
FIG. 1 is a side view of an exemplary battery cell that may be used along with several other such cells, in a charging gel or fluid, in accordance with aspects of the invention.

FIG. 1 is a side view of an exemplary battery cell 101 that may be used along with several other such cells, in a charging gel or fluid, in accordance with aspects of the invention. Cell 101 is a complete battery, capacitor or other device able to deliver a current for use in an appliance. The precise form of Cell 101 is illustrative only, and many other alternate forms may be used to carry out aspects of the invention.

Among its capabilities, cell 101 may deliver an electrical current from a cathode 103, and through a circuit, and receive current to an anode 105 (each an electrode). Electrodes 103 and 105 each have a multi-valent, curved outer contact area, which contribute to the overall curved and generally spherical or otherwise streamlined shape of cell 101. However, in some embodiments, cell 101 may alter its density, for example, by expanding and/or contracting depending upon its charge condition, as will be discussed in greater detail, below. Electrodes 103 and 105 may make contact with neighboring electrodes (not pictured) with contact areas of a variety shapes and sizes, including, but not limited to, neighboring contacts of other cells similar to cell 101. However, owing the shapes and locations of electrodes 103 and 105 (and similar, neighboring electrodes) for such contact to occur, generally, a neighboring electrode to the right or left of cell 101 will need to be oriented in a substantially similar way as cell 101, and substantially to the left or right of it. A wide variety of alignment techniques may be used, including neighboring physical force, gravitational bias (for example, due to bottom weights 107) or, in a preferred embodiment, magnetic alignment. To explicate that embodiment, cell 101 may comprise a magnetic dipole (or dipoles) such as that shown as positive magnetic pole(s) 109, at or about the center of the cathode, and negative magnetic pole(s) 111, at or about the center of the anode. The magnetic poles 109 and 111 generally lead each such similar cell, with the same components as cell 101, to mutually align and touch one another's contacts, in series, and, in some embodiments, at least some of them, or some groups of them, may be placed in parallel.

To alter its density, a cell such as cell 101 may, for example, contract its electrodes inward, toward one another. An at least partially flexible or otherwise collapsible inner container wall 110 holding electrolyte 113 of cell 101 may aid in effectuating that change in density, for example, with the aid of a compressible/expandable interstitial space 112, confined by overlapping sliding louvers 116, which are non-conducting and may contain a compressible gas. But a wide variety of alternate means for altering the density of the cell, including, but not limited to, alterations to the electrolytic or other chemical or physical contents, may also be effectuated. In some embodiments, cell 101 depletes its charge, by discharging to provide power to a circuit, it decreases in size and/or increases its density—although the reverse, and other filtration enabling differentials linked to charge condition may, alternative or in addition, be used. For example, near the end of discharge, for example, by a current-triggered switch 114 on part of cathode 103, may disconnect part of cathode 103, such as mid-cathode section 115, from the remainder of the cathode. At that point, a charge-carrying ion, such as the positively-charged Lithium ion pictured, may continue to build without neutralization by incoming electrons from the circuit current. In conjunction with a similarly isolated negatively-charged section of anode 105, that discharge-dependent negative charge may cause a mutual, inward pulling attraction between the two anodes, which may travel in towards one another on an insulated bridge 117 (e.g., on which at least one of the electrode's middle sections may run, laterally on a rail). Recharging cell 101 may reset switch 114 by the same switch, which may be reversed by reversed current. As will be discussed with reference to further figures, below, the alteration of cell 101's density may lead it, and other cells with the same structure, to automatically sort themselves by grouping together when in a similar charge condition, for example, in a tank or other container holding such cells. The rounded, spherical or otherwise stream-lined shape of a group of cells such as 101 may facilitate the movement and sorting of cells past one another, for sorting purposes, as will be explained further, below.

In some embodiments, cell 101 may expand, rather than contract, and decrease in density, rather than increase in density, upon discharge. In such embodiments, a neighboring net positive charge, for example, on bridge 117 may drive cathode section 115 further away, rather than closer, upon section 115 accumulating a net positive charge (for example, from intercalated Lithium ions). This may be preferred in embodiments where the magnetic dipole is on a central element, such as bridge 117, that becomes too shielded and distant between cells and other neighboring magnetic materials to become effective. This may have a freeing effect, permitting cells such as 201 to move more freely, and separate out, upon discharge, as will be discussed in greater detail below.

Figure 2:
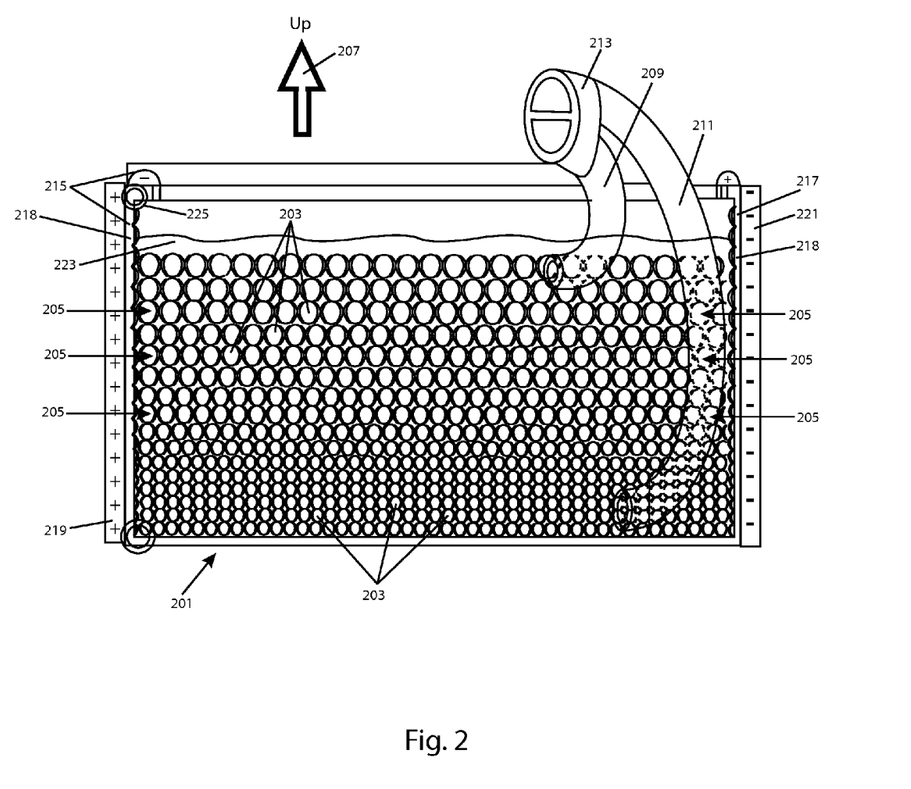
FIG. 2 is a side, cross-sectional view of a battery cell fluid tank, including several battery cells such as the example provided in FIG. 1, above, in accordance with aspects of the present invention.

FIG. 2 is a side, cross-sectional view of an exemplary battery cell fluid tank 201, including several battery cells such as the example provided in FIG. 1, above, in accordance with aspects of the present invention. A plurality of variable-density battery cells, such as the examples shown as 203, which may each be similar to or as discussed in reference to FIG. 1, above, are present in the tank, and aligned in rows by their magnetic dipoles, as also discussed in reference to FIG. 1. In addition, cells 203 are stratified in layers or rows, such as those examples shown as 205, according to their relative density (weight per volume) and are so stratified, in part, due to the influence of gravity (producing a force opposite to that shown as the "Up" arrow 207, or, vertically downward from the perspective of the figure). To ease viewing, only one vertical plane layer of cells 203 are shown, but it should be understood that tank 201 is a three-dimensional volume, and cells 203 would extend in three dimensions, not just two, and include several layers into the page, as well as up and down and left and right, in practice. Because, as discussed above, the density of cells such as 203 may increase with discharge and, in some embodiments, the degree of discharge may lead to a graduated density change, cells 203 occur in several such rows, in which the individual cells are approximately of equal size and charge condition. As mentioned above, in some embodiments, the cells 203 may become less dense with discharge and, if such embodiments are implemented in this figure, the most fully discharged cells will be in the top-most layer(s). As also mentioned above, in some embodiments, those discharged cells may also be more free from magnetic alignment with each other, and easier to pull apart from each other. As such, discharged cells at the top of the tank will be easier to remove, for example, by an upper siphon tube 209, which may be connected to a pump (not pictured) and lower filling tube 211 (for example, with a variably-sealing nozzle that may variably connect and form a seal with bifurcated nozzle inlet/outlet 213). Such a pump may simultaneously load newly-charged, dense and small cells 205 at the bottom of tank 201 via tube 211 and remove discharged cells at the top of the tank via tube 209. The discharged cells may then be recharged in an off-board facility, according to the optimal recharging regimen for the cells, and the tank exchange for fresh, charged cells is performed more quickly than on-board recharging. An exemplary pump handle and bifurcated nozzle system are shown in greater detail, below, in reference to FIG. 3.

To discharge their energy into a circuit delivering power to an appliance, bridging the lead and tail (outer-facing) anodes and cathodes of each cell row, terminal contacts at a super-anode 215 and a super-cathode 217, at opposite ends of the tank, are provided, with contacts 218 that variably electrically connect with those lead anodes and cathodes in each row 205 of cells 203. To maintain proper alignment, actuable magnets, such as those shown as positive inward-facing pole 219 and negative inward-facing pole 221, may aid in maintaining the alignment of the cells 203 and rows 205, maintaining series of cells for the circuit. To facilitate the resorting, poles 219 and 221 may be alterable, and/or new magnetic fields (for example, caused by actuable/creatable upward-facing magnets near the bottom of the tank 201) may be formed by additional magnets to momentarily free up, or even drive downward, the movement of cells 203 until they are properly re-sorted by charge. To maintain power to external circuits during these resorting maneuvers, and to power these maneuvers, capacitors or an auxiliary battery may be used. Also, to aid the free-movement and resorting of cells 203, an interstitial suction-enabling, lubricant or other interstitial fluid 223 may surround the cells, and aid in their siphoning via tubes 209 and 211. Preferably, such a fluid is not highly conductive, with few dissolved electrolytes, preventing short-circuiting, but does not form an unbridgeable insulating layer between anodes and cathodes of cells that abut one another. Deionized water, among other liquids, gels and/or fluids, may be used.

A margin of air or empty space is shown at the top of tank 201, such that, with the expansion of discharged cells, there will be sufficient room for the cells, and enabling cell movement. A sensor and automatic shut-off mechanism in a pump servicing the tank may aid in accomplishing optimum fill levels for that purpose. Discharge vents, such as that shown 225 may be included to prevent explosion in the event of gas buildup.

Figure 3:
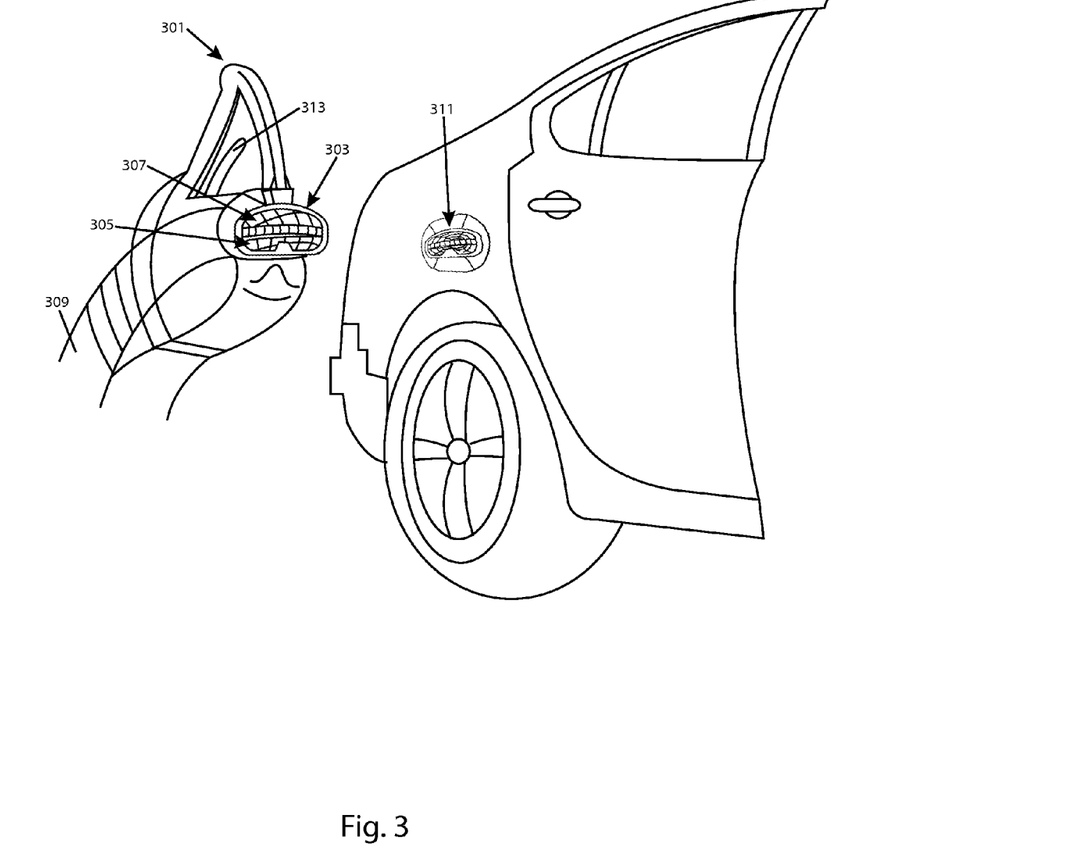
FIG. 3 is a perspective illustration of aspects of an exemplary system, including an actuable pump handle 301 and bifurcated nozzle 303 for the simultaneous delivery of freshly-charged battery cells and fluid in which they are immersed and removal of discharged battery cells and fluid in which they are immersed, in accordance with aspects of the present invention.

FIG. 3 is a perspective illustration of aspects of an exemplary system, including an actuable pump handle 301 and bifurcated nozzle 303 for the simultaneous delivery of freshly-charged battery cells and fluid in which they are immersed and removal of discharged battery cells and fluid in which they are immersed. Nozzle 303 is bifurcated into a removal inlet 305 and a delivery outlet 307. Inlet 305 and outlet 307 are exits of an inlet tube and an outflow tube, respectively, comprised in pump service hose 309. As mentioned above, a pump (not pictured) may drive the flow of both newly charged cells from outlet 307 and discharged cells into inlet 305, and the suction-enabling, lubricating insulating fluid in which they are immersed. The pump may drive flow from either or both tubes, as pressure from outlet 307 or suction from inlet 305 will drive the other with an fluid-tight seal between nozzle 303 and a tank that it is operating on—for example, a tanks such as that discussed above, with reference to FIG. 2, with its corresponding nozzle inlet/outlet 213.

Such a tank nozzle inlet/outlet is shown as 311, in connection with a battery tank installed on an electrically-powered motor vehicle. Tank inlet/outlet 311, as with inlet/outlet 213, is bifurcated to complement the corresponding inlet 305 and outlet 307 of nozzle 303, with which it may variably mate, and form a fluid-tight seal. To perform a discharged cell replacement (with fresh cells) a user may press nozzle 303 into tank inlet/outlet 311 and, if a control system connected to sensors detecting proper sealing between the two (for example, in the pump handle 301 or inlet and outlet tubes), the pump may begin to operate, in some embodiments, after a user has actuated a GUI, which may include pump actuation handle 313. Preferably, a hermetic valve seals both the inlet 305 and outlet 307, and complementary inlet/outlet 303, to prevent spillage and the introduction of air into the system.

Figure 4:
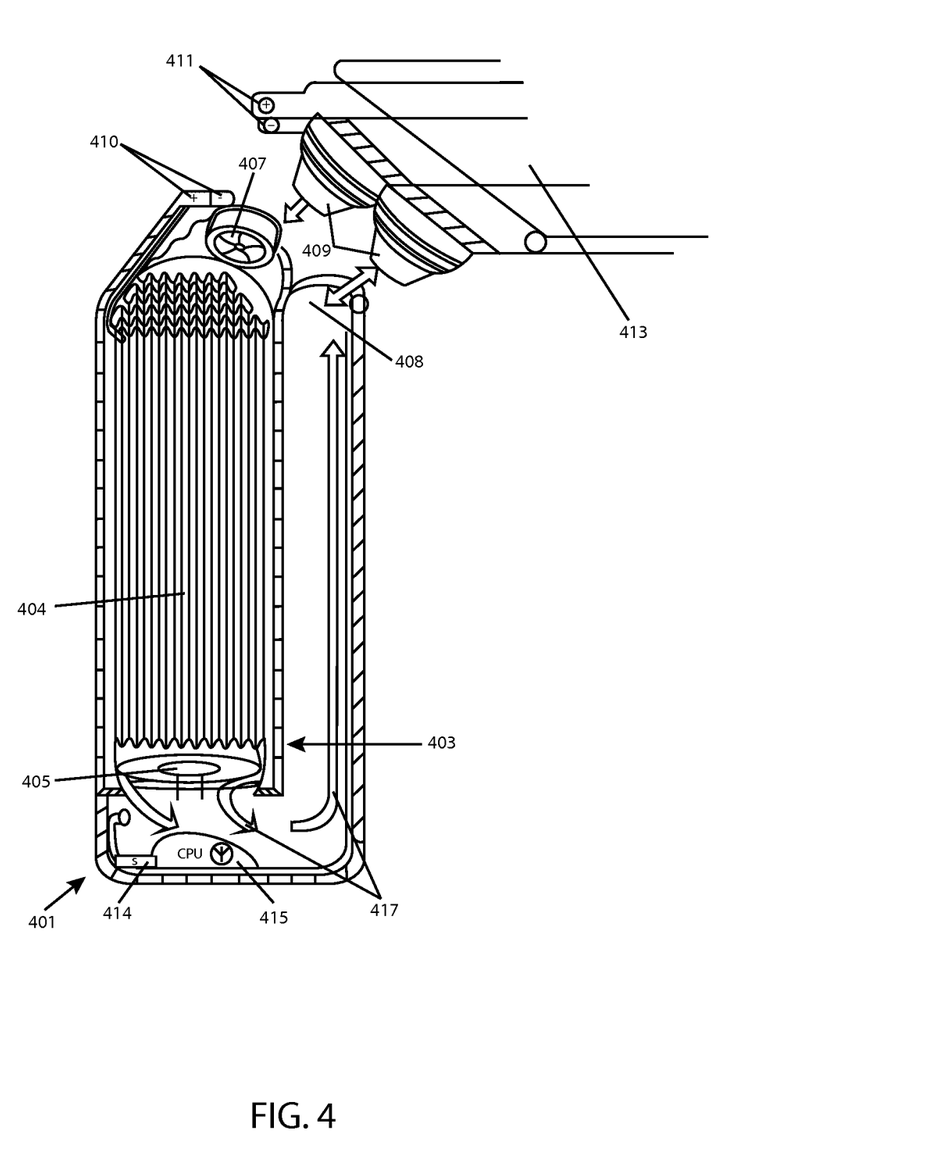
FIG. 4 depicts a battery cell 401 with a system enabling specialized electrolyte flushing, which, in effect, allows for rapid recharging in accordance with additional aspects of the invention.

FIG. 4 depicts a battery cell 401 with a system enabling specialized electrolyte flushing, which, in effect, allows for rapid recharging in accordance with additional aspects of the invention. Cell 401 comprises an inner cell section 403, containing some conventional components of a lithium ion battery: folded and/or wound layers of electrodes 404 (anode and cathode layers, with separators) immersed in an electrolyte, such as an organic solvent and Li+ and $PF_6-$ salt ions dissolved within it. However, unlike conventional cells, section 403 is not fully "starved" with absolutely minimal electrolyte, and a variable valve 405, along with a variable inlet valve 407 and outlet valve 408 and corresponding flushing nozzles 409 from an external recharging system (not fully pictured), may permit the periodic flushing of specialized electrolyte fluids between the anode and cathode layers, to hasten recharging, clean impurities, and prolong the life of the cell. In addition, reverse-current recharging electrodes 411, associated with nozzles 409 in a recharging armature 413, assist in effectuating recharging, along with the flushing techniques, as discussed below, for example, by interfacing and driving current through anode and cathode caps 410.

An exemplary recharging process for cell 401 may include the following steps. First, cell 401 is discharged, for example, by powering an appliance until all free lithium ions in the electrolyte have intercalated with material in the cathode (for example, a crystal structure incorporating Li+ ions, driving electron flow into the cathode). Second, recharging armature 411 may extend from a recharging system, engage with valves 407 and 408, and proceed to drive electrolyte with a high concentration of $PF_6-$ ions, and no Li+ ions, from the upper outlet nozzle, into valve 407, and through the pleated electrode material 404. At the same time, armature 413, through contacts 411, begins to drive electrons out of the cathode material with a reverse (charging) current. This charging current may be much higher, and recharging accomplished much faster, than in a comparable non-flushing battery cell. After substantially all of the Li+ ions are stripped from the cathode, and flushed, the recharging system may begin to flush the electrodes with a new electrolyte solution, this time, with a high concentration of Li+ ions, while applying a strong recharging current to drive electrons into the anode and, for example, Li+ ions into the anode, again intercalating them, in this instance, into an anode material, such as graphite. Finally, a balanced electrolyte may be introduced in final steps, with matching, conventional levels of both Li+ and $PF_6-$, to again provide a buffer for discharge reactions. To assist in the determination when the relevant ions are flushed and saturated for each stage, a sensor 414 placed at the exit of the inner cell 403 (for example, below valve 405) may be provided, along with a local processor 415, which may be in connection with a control subsystem within the recharging system—such as, but not limited to, the control system discussed with reference to FIG. 9, below. Sensor 414 is preferably placed directly in the exit path 417 of the flushed fluid exiting valve 405, and being pulled into the bottom nozzle 409, to provide information, for example, concerning when all Li+ ions have been stripped from the cathode (and the sensor detects no such ions), in that step, and to provide information concerning when Li+ ions have saturated the anode (and detects too high a concentration of that ion), in that step.

The type of battery (lithium ion) used in this example is exemplary only, and such a staged ion flushing and saturation technique may be used with virtually any other battery type, and even some capacitors.

Figure 5:
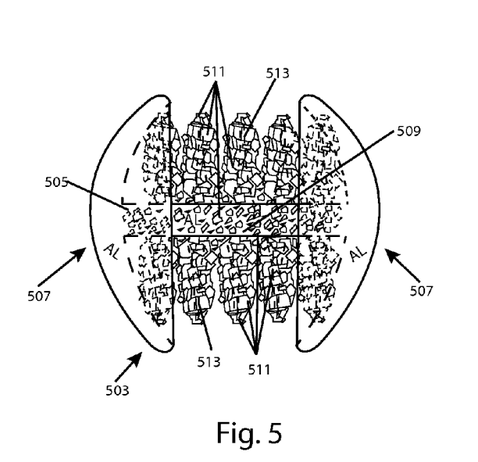
FIG. 5 depicts a stream-lined cathode element, which may be variably combined, flushed and replaced with other such cathode elements to accomplish rapid recharging of a battery cell in accordance with aspects of the present invention.

FIG. 5 depicts a stream-lined cathode element 503, which may be variably combined, flushed and replaced with other such cathode elements to accomplish rapid recharging of a battery cell in accordance with aspects of the present invention. Cathode element 503 may comprise any suitable cathode matter, such as Aluminum, among many other possible elements, alloys and other materials, in a skeleton 505, which may be comprise multi-valent outer contact surfaces 507, electrically connected with one another and the remainder of the skeleton 505, for example, through central bridging 509, which is also comprised in the skeleton 505. Skeleton 505 may also comprise crystals 511, or other cathode materials, for accepting ions (such as Li+ ions) or other electrolytic products or aspects from a surrounding electrolyte(s). Skeleton 505 preferably is ciliated, reticulated or contains other surface-area maximizing features, such as the examples shown as 513, that are thinly constructed (for example, 7-30 microns in width, to maximize the ion acceptance capacity of cathode element 503. Crystals 511 preferably coat, impregnate or are otherwise comprised throughout at least the surface of each such surface feature.

Due to their size and shape, contacts 507 also serve to protect surface features 513 and crystals 511, while permitting electrolyte to enter and interact with them. As a result, a multitude of cathode elements 503 may be piled or otherwise variably grouped together while maintaining electrical contact with one another, but avoid destroying one another, for example, when variably flushed with a surrounding electrolyte. Protecting contacts 507 may take a wide variety of alternate forms to protect crystals 511, or other cathode structures, such more completely covering and porous structures, or a single or multiple such contacts 507, as long as the pores are sufficiently large to allow at least the Lithium ion (or other similar electrolyte) enter. As with battery cell 101, discussed above, cathode element 503 may contain magnetic dipole(s), or a ferromagnetic material, which may variably react with, and may be used with an external magnetic field, which itself may be variable, to encourage binding and electrical contact between a plurality of such cathode elements in a cathode container, as will be discussed in greater detail, below.

Similar structures, but using anode materials (such as copper, as a skeleton material, and graphite, as a coating material), may also or alternatively be used in a battery cell system permitting variable, rapid flushing to hasten recharging and allow for the repair of battery cells.

Figure 6:
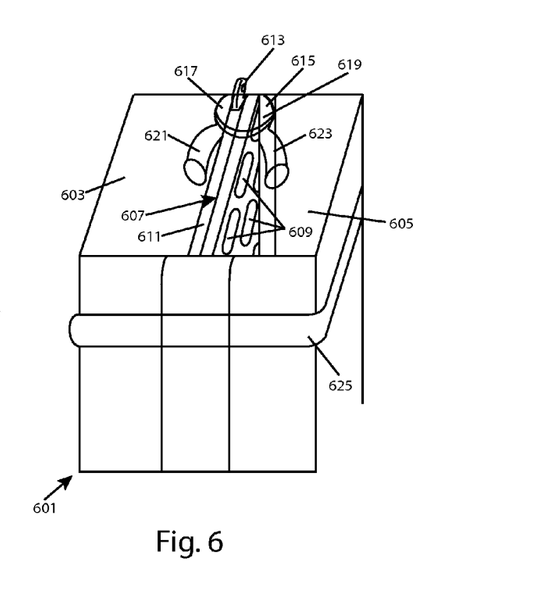
FIG. 6 depicts part of an exemplary flushable cathode and anode and electrolyte containment system, permitting the variable flushing and filling of a cathode and an anode chamber with electrolyte and cathode and anode elements, such as the elements discussed with reference to FIG. 5.

FIG. 6 depicts part of an exemplary flushable cathode and anode and electrolyte containment system 601, permitting the variable flushing and filling of a cathode chamber 605 and an anode chamber 603 with cathode and anode elements, respectively, such as element 501, and such as a similar anode element, discussed above. To ease presentation and understanding by showing the inner components of chambers 603 and 605, system 601 is shown without a top containment wall. However, it should be understood that, in a preferred embodiment, such a top containment wall is included, along with at least five other, or an otherwise complete, set of containment wall(s). An exemplary embodiment of a top containment wall will be discussed with reference to FIG. 7, below.

Cathode chamber 605 and anode chamber 603 may be variably separated by an adjustable dividing wall 607. Dividing wall 607 comprises variable openings, such as those examples shown as 609, and may further comprise a slidable side 611 with at least partially variably-overlapping pores. By actuating a handle 613, which may be actuated by a control system, such as a hardware and software control system described in reference to FIG. 9, below, the amount of fluid flow may be varied, and even brought to zero, with solid portions of side 613 completely covering each opening 609, in some configurations variably selectable by the system and/or user. Inlet channel 615 straddles the dividing wall 607, at the top of containment system 601, as shown, and itself may be divided into two sections, anode feed section 617 and cathode feed section 619, each for separately channeling electrolyte fluid and anode and/or cathode elements into anode chamber 603 and cathode chamber 605, respectively, via distribution tubes 621 and 623. Distribution tubes 621 and 623 are, likewise, respectively dedicated to supplying gel, liquid or other materials from sections 617 and 619 and into anode section 603 and cathode section 605, respectively. As will be explained in greater detail, below, with reference to FIG. 7, inlet channel 615 may be variably sealable by an inlet port, within a top containment wall.

Figure 7:
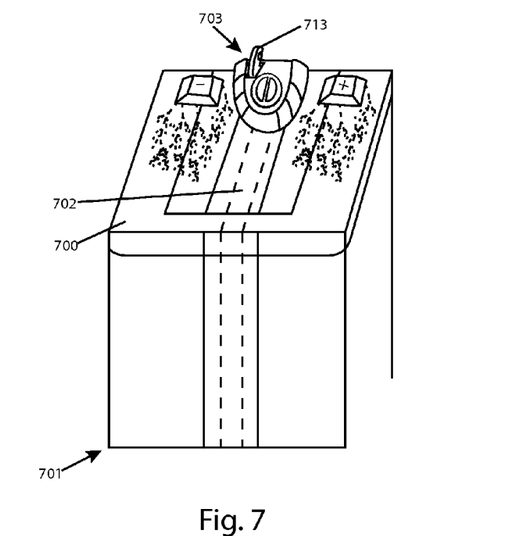
FIG. 7 depicts part of the same exemplary flushable cathode and anode and electrolyte containment system as in FIG. 6, but including a top containment wall, and other additional aspects of the invention.

FIG. 7 depicts part of the same exemplary flushable cathode and anode and electrolyte containment system as in FIG. 6 (now 701), but including a top containment wall 700, and other additional aspects of the invention. Containment wall 700, when installed onto system 701, forms an air- and liquid-tight seal, separately closing chambers 603 and 605, preferably, with the aid of sealing strip 702 and sealing rings (not shown in this figure, but shown as 625 in FIG. 6) which preferably comprise an elastomeric material, such as rubber gasket or O-ring material.

An inlet port 703 is also pictured, which also forms an air- and liquid-tight seal, separately, with each section of inlet channel 615 and, variably, with complementary bifurcated nozzle (not pictured) with separate feeding sections and connected tubes for each section of port 703 and channel 615 and, therefore, is capable of separately feeding anode electrolyte and elements into the anode chamber 603 and cathode electrolyte and elements into the cathode chamber. As in other embodiments and aspects of the invention, a lubricant or other suction-improving fluid may be added to the electrolyte and cathode and anode elements, to ease their transfer into system 701. An outlet port, for example, at the base of system 701, may also be provided, to assist in flushing discharged cathode and anode elements from system 701 as new, elements, in a charged and pure condition, are added through port 703. Both port 703 and the outlet port may be variably valved, to prevent unintended leakage while permitting outflow during such a flushing procedure. To aid in flushing each chamber 603 and 605, completely, dividing wall 607 may be placed in a condition closing its variable openings 609 prior to flushing with new electrolyte and materials through port 703, for example, via an actuator moving handle 613 (not pictured) of an external recharging and control system, which may also comprise the bifurcated feed nozzle, discussed above.

Figure 8:
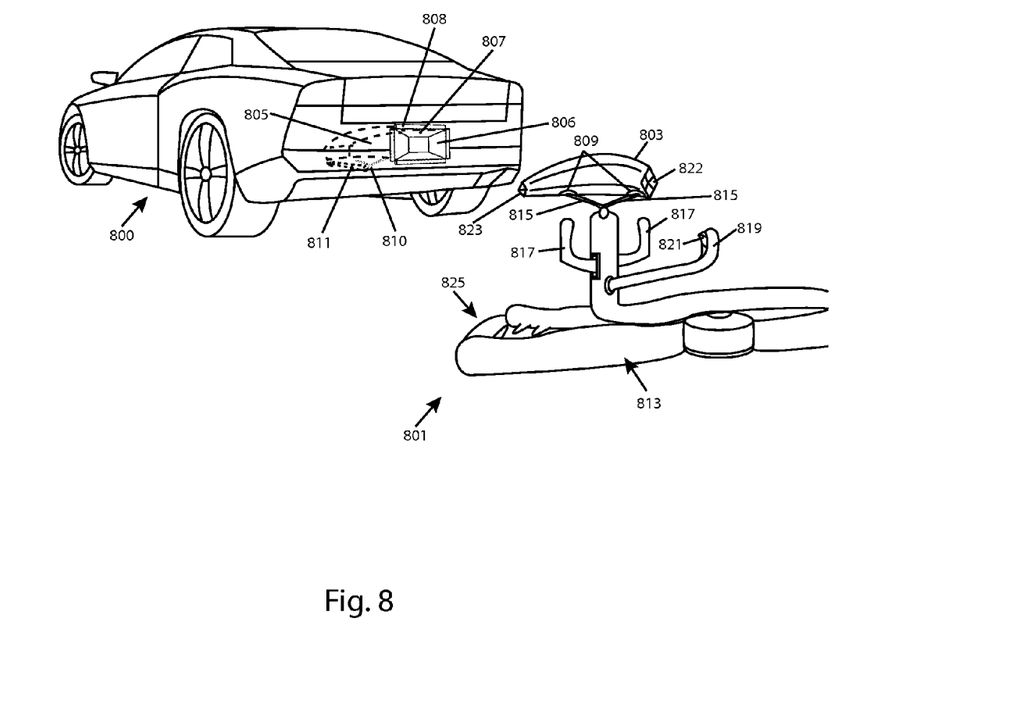
FIG. 8 depicts an exemplary battery reloading system in accordance with aspects of the present invention, in the context of restoring or changing power resources for an electric motor vehicle.

FIG. 8 depicts an exemplary battery reloading system 801 in accordance with aspects of the present invention, in the context of restoring or changing power resources for an electric motor vehicle 800. Rather than attempt to charge a battery on-board the vehicle 800, system 801 provides a system for rapidly inserting a freshly charged and/or otherwise restored ("new") battery 803, preferably with a streamlined, torpedo structure into a complementarily-shaped battery receiving and mounting bay, 805, within the motor vehicle 800. A variable one-way receiving port 806, which may permit injection of a new battery, but may also prevent its escape through valve louvers 807, which may rotate about axes at the center of louver joints 808, inward, to permit the entry of a new battery 803, but which louvers also collide with one another when encountering reverse force from a battery that has been installed in bay 805. Once installed within bay 805, anode and cathode contacts 809 (and optional data delivery contacts, not separately pictured), of battery 803 may permit battery 803 to deliver electrical power to the motor vehicle 800 via a contact harness 810 within bay 805, unless and until the battery 803 is ejected.

Preferably, from the same process of the maneuver for loading the new battery, the system 801 may eject another, preferably, more depleted, but similarly-shaped ("old") battery, if present, via a variable exit or release gate 811, at a different point in bay 805 than the entrance point of the new battery. Also preferably, the new battery may aid, along with gravity, in pushing the old battery out of the bay, and/or triggering release gate 811 to open (releasing the old battery) and then return to a closed, locked position, as the new battery is loaded and, in the process, electrical contacts on the new and/or old battery linked to control system hardware (such as control system hardware set forth below, with reference to FIG. 9) relay information to a control system relating to the final charge states, capacity and other specifications of both the old and new battery. Also preferably, the control system may determine a net amount of additional power, and other quality gains or exchange results, affecting the motor vehicle, and may aid in determining a proper monetary cost to be applied to a user requesting such a reloading maneuver as described herein, via data derived from front and rear contacts (discussed further below). Such information may be ascertained by the system earlier, however and, for example, prior to carrying out the exchange. In some embodiments, a user may request different charge, capacity and other battery characteristics, pay for them in advance, and if payment clears, the system may select a new battery for replacing the user's old battery to accomplish the different qualities requested and/or paid for by the user.

The battery reloading maneuvers described above may be accomplished, in part, with the aid of a loading rig 813. Loading rig 813, as with the motor vehicle 800, may have its own contact harness 815, to temporarily electrically connect to contacts 809 of batteries such as 803, if and when they are held on the rig (as pictured). Actuable gripping arms 817 and pushing arm 819 may aid harness 813, and the operators and/or system utilizing it to load battery 803 into bay 805 via one-way receiving port 806. An informational electronic plug or contact set 821 may ascertain information from battery 803 and the replaced battery, via complementary rear contacts 822, while arm 819 pushes battery 803 into place, and its front contacts 823 communicate with rear contacts from the old battery, with which they touch. In some embodiments, harness 815 may extend to front and rear contacts 823 and 822, accomplishing both data transfer and power delivery aspects of the invention, and separate contacts 809 may be omitted (or vice versa). Carriage 813, or another container to which carriage 813 delivers an old battery, for example, captured by bay-drop net or cantilever 825, may accomplish recharging of an old battery ejected from bay 805 in the exchange process, after bay-drop net or cantilever 825 has caught it.

Figure 9:
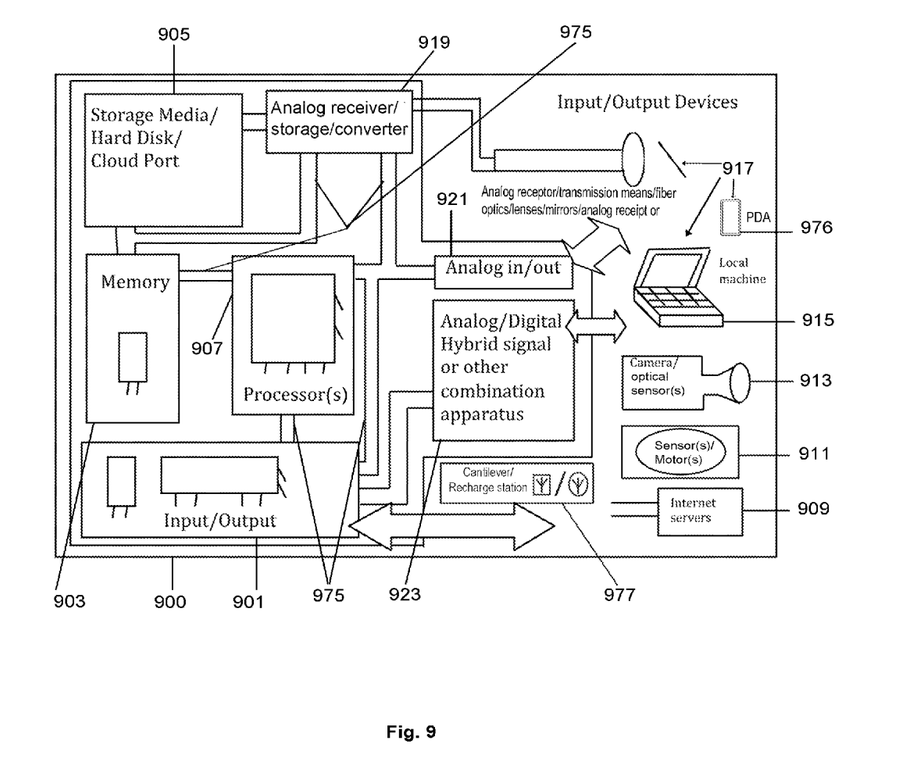
FIG. 9 is a schematic block diagram of some elements of an exemplary hardware and software control system that may be used in accordance with aspects of the present invention.

FIG. 9 is a schematic block diagram of some elements of an exemplary control system 900 that may be used in accordance with aspects of the present invention, such as, but not limited to, actuating sensors, motors, battery charging operations and station machinery (such as, but not limited to battery-swapping armatures and flushing mechanisms, and determining currents and amounts for recharge and execute transactions with users), other actuators in connection with structural aspects, such as braces and frame pieces, and driving current and current patterns for recharging. The generic and other components and aspects described herein are not exhaustive of the many different systems and variations, including a number of possible hardware aspects and machine-readable media that might be used, in accordance with the present invention. Rather, the system 900 is described to make clear how aspects may be implemented. Among other components, the system 900 includes an input/output device 901, a memory device 903, storage media and/or hard disk recorder and/or cloud storage port or connection device 905, and a processor or processors 907. The processor(s) 907 is (are) capable of receiving, interpreting, processing and manipulating signals and executing instructions for further processing and for output, pre-output or storage in and outside of the system. The processor(s) 907 may be general or multipurpose, single- or multi-threaded, and may have a single core or several processor cores, including, but not limited to, microprocessors. Among other things, the processor(s) 907 is/are capable of processing signals and instructions for the input/output device 901, analog receiver/storage/converter device 919, analog in/out device 921, and/or analog/digital or other combination apparatus 923 to cause a display, light-affecting apparatus and/or other user interface with active physical controls, such as a charging station pump (any of which may be comprised or partially comprised in a GUI) to be provided for use by a user on hardware, such as a personal computer monitor or PDA (Personal Digital Assistant) screen (including, but not limited to, monitors or touch- and gesture-actuable displays) or terminal monitor with a mouse and keyboard or other input hardware and presentation and input software (as in a software application GUI), and/or other physical controls. Alternatively, or in addition, the system, using processors 907 and input/output devices 919, 921 and/or 923, may accept and exert passive and other physical (e.g., tactile) user and environmental input and output.

For example, and in connection with aspects of the invention discussed in reference to the remaining figures, the system may carry out any aspects of the present invention as necessary with associated hardware and using specialized software, including, but not limited to, controlling the placement of recharging contacts and flushing nozzles on rechargeable, flushable battery sections, actuating magnetic fields to align batteries in a battery tank, controlling the flow and patterns of current, power usage, power and current buffering (for example, using capacitors or a capacitor bank) and using attached sensor/motors and other actuating devices and system-wide interfaces to effect aspects of a recharging system. The system may also, among many other things described for control systems in this application, respond to user, sensor and other input (for example, by a user-actuated GUI controlled by computer hardware and software or by another physical control) to activate/deactivate recharging systems and pumps, store batteries and monitor their status in an inventory, exchange batteries and determine net power, capacity and other exchanges with users, or perform any other aspect of the invention requiring or benefiting from use of a control system. The system 901 may also permit the user and/or system-variation of settings, including but not limited to the affects of user activity on modes of operation of the system, and send external alerts and other communications (for example, to users and administrators) via external communication devices, for any control system aspect that may require or benefit from such external or system-extending communications.

The processor 907 is capable of processing instructions stored in memory devices 903 and/or 905 (and/or ROM or RAM), and may communicate with any of these, and/or any other connected component, via system buses 975. Input/output device 901 is capable of input/output operations for the system, and may include/communicate with any number of input and/or output hardware, such as a computer mouse, keyboard, entry pad, actuable display, networked or connected second computer, other GUI aspects, camera(s) or scanner(s), sensor(s), sensor/motor(s), range-finders, GPS systems, receiever(s), transmitter(s), transceiver(s), transflecting transceivers ("transflecters"), antennas, electromagnetic actuator(s), mixing board, reel-to-reel tape recorder, external hard disk recorder (solid state or rotary), additional hardware controls (such as, but not limited to, buttons and switches, and actuators, current or potential applying contacts and other transfer elements, light sources, speakers, additional video and/or sound editing system or gear, filters, computer display screen or touch screen. It is to be understood that the input and output of the system may be in any useable form, including, but not limited to, signals, data, commands/instructions and output for presentation and manipulation by a user in a GUI. Such a GUI hardware unit and other input/output devices could implement a user interface created by machine-readable means, such as software, permitting the user to carry out any of the user settings, commands and input/output discussed above, and elsewhere in this application.

901, 903, 905, 907, 919, 921 and 923 are connected and able to communicate communications, transmissions and instructions via system busses 975. Storage media and/or hard disk recorder and/or cloud storage port or connection device 905 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive.

Generally speaking, the system may be implemented as a client/server arrangement, where features of the invention are performed on a remote server, networked to the client and made a client and server by software on both the client computer and server computer. Input and output devices may deliver their input and receive output by any known means of communicating and/or transmitting communications, signals, commands and/or data input/output, including, but not limited to, input through the devices illustrated in examples shown as 917, such as 909, 911, 913, 915, and 977 and any other devices, hardware or other input/output generating and receiving aspects. Any phenomenon that may be sensed may be managed, manipulated and distributed and may be taken or converted as input or output through any sensor or carrier known in the art. In addition, directly carried elements (for example a light stream taken by fiber optics from a view of a scene) may be directly managed, manipulated and distributed in whole or in part to enhance output, and whole ambient light or other RF information for an environmental region may be taken by a series of sensors dedicated to angles of detection, or an omnidirectional sensor or series of sensors which record direction as well as the presence of electromagnetic or other radiation. While this example is illustrative, it is understood that any form of electromagnetism, compression wave or other sensory phenomenon may include such sensory directional and 3D locational information, which may also be made possible by multiple locations of sensing, preferably, in a similar, if not identical, time frame. The system may condition, select all or part of, alter and/or generate composites from all or part of such direct or analog image or other sensory transmissions, including physical samples (such as DNA, fingerprints, iris, and other biometric samples or scans) and may combine them with other forms of data, such as image files, dossiers or metadata, if such direct or data encoded sources are used.

While the illustrated system example 900 may be helpful to understand the implementation of aspects of the invention, it is understood that any form of computer system may be used to implement many control system and other aspects of the invention—for example, a simpler computer system containing just a processor (datapath and control) for executing instructions from a memory or transmission source. The aspects or features set forth may be implemented with, and in any combination of, digital electronic circuitry, hardware, software, firmware, or in analog or direct (such as electromagnetic wave-based, physical wave-based or analog electronic, magnetic or direct transmission, without translation and the attendant degradation, of the medium) systems or circuitry or associational storage and transmission, any of which may be aided with enhancing media from external hardware and software, optionally, by wired or wireless networked connection, such as by LAN, WAN or the many connections forming the internet or local networks. The system can be embodied in a tangibly-stored computer program, as by a machine-readable medium and propagated signal, for execution by a programmable processor. The method steps of the embodiments of the present invention also may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

I claim:

1. A system for rapidly replacing at least one battery, comprising:
   at least one container configured for holding, said at least one battery;
   wherein said at least one container comprises contacts configured for electrically connecting with said at least one battery; and
   wherein said at least one container is configured to receive said at least one battery;
   wherein said at least one container is configured to hold and facilitate an exchange of at least one charged battery and at least one less charged battery;
   a control system, wherein said control system is configured to assess a net charge gain and/or exchange results from the exchange of the at least one less charged battery and the at least one charged battery; and
   wherein the system comprises a loading device comprising at least one contact configured to temporarily electrically connect with said at least one battery, and wherein a battery receiving bay is configured to be triggered to remove said at least one less charged battery and load said at least one charged battery.

2. The system for rapidly replacing at least one battery of claim 1, wherein said control system assesses a net charge gain from the exchange of said less charged battery for said charged battery.

3. The system for rapidly replacing at least one battery of claim 2, wherein said control system assesses a financial charge to a user initiating said exchange of said less charged battery for said charged battery.

4. The system for rapidly replacing at least one battery of claim 2, wherein said assessment is made prior to effectuating said exchange.

5. The system for rapidly replacing at least one battery of claim 1, wherein said at least one battery, or at least one battery of substantially the same design as said at least one battery, is comprised in the system and comprises an at least partially streamlined outer profile comprising at least two contacts, each of which at least two contacts is connected with either cathode(s) or anode(s) material;
   wherein said at least one battery or said at least one battery of substantially the same design is configured to be placed into, and aligned with electrical contacts in, said at least one container, and said at least one container services an appliance; and
   wherein said at least one battery or said battery of substantially the same design is configured to be placed into and held in said at least one container with a fluid in which it is immersed.

6. The system for rapidly replacing at least one battery of claim 5, wherein said at least one battery or said battery of substantially the same design, and other batteries of substantially the same design, are suspended together in said fluid, and wherein said fluid comprises an insulator, which prevents short-circuiting.

7. The system for rapidly replacing at least one battery of claim 6, wherein said at least one container comprises a liquid-tight holding tank with electrical contacts adapted for engaging at least one of an anode(s) and a cathode(s) of any of said at least one battery, said at least one battery of the same design, and said other batteries of substantially the same design.

8. The system for rapidly replacing at least one battery of claim 7, wherein said tank is configured to be serviced by tubes or other conduits configured for rapidly removing discharged batteries, and replacing them with charged batteries, via a pump that engages said fluid.

9. The system for rapidly replacing at least one battery of claim 8, wherein said pump brings said discharged batteries to a recharging device for returning them to a charged state, and brings charged batteries to an appliance, providing electrical power.

10. The system for rapidly replacing at least one battery of claim 9, wherein said pump comprises a bifurcated nozzle servicing two separate exchange tubes connected with said tank, comprising a first exchange tube for discharged battery removal from said tank, and a second exchange tube for charged battery delivery to said tank.

11. The system for rapidly replacing at least one battery of claim 5, wherein said at least one battery or said at least one battery of substantially the same design changes its density upon discharge from a charged state and upon charging from a discharged state and is thereby configured to be sorted according to a charged or discharged state.

* * * * *